(12) United States Patent
Roba et al.

(10) Patent No.: US 7,461,524 B2
(45) Date of Patent: Dec. 9, 2008

(54) DEVICE AND METHOD FOR MANUFACTURING A PREFORM FOR OPTICAL FIBRES BY CHEMICAL VAPOUR DEPOSITION

(75) Inventors: Giacomo Stefano Roba, Monza (IT); Massimo Nutini, Milan (IT); Marco Ruzzier, Milan (IT); Franco Veronelli, Lainate (IT)

(73) Assignee: Prysmian Cavi e Sistemi Energia S.r.L., Milan (IT)

( * ) Notice: Subject to any disclaimer, the term of this patent is extended or adjusted under 35 U.S.C. 154(b) by 658 days.

(21) Appl. No.: 10/481,748

(22) PCT Filed: Jun. 19, 2002

(86) PCT No.: PCT/EP02/06778

§ 371 (c)(1),
(2), (4) Date: Jul. 7, 2004

(87) PCT Pub. No.: WO03/000609

PCT Pub. Date: Jan. 3, 2003

(65) Prior Publication Data

US 2004/0237594 A1 Dec. 2, 2004

Related U.S. Application Data

(60) Provisional application No. 60/303,410, filed on Jul. 9, 2001.

(30) Foreign Application Priority Data

Jun. 25, 2001 (EP) .................... 01202444

(51) Int. Cl.
*C03B 37/018* (2006.01)
(52) U.S. Cl. ..................................... 65/413
(58) Field of Classification Search ............ 65/413, 65/421, 532
See application file for complete search history.

(56) References Cited

U.S. PATENT DOCUMENTS 4,289,517 A * 9/1981 Bailey et al. .............. 65/422
5,211,732 A 5/1993 Abbott et al.

FOREIGN PATENT DOCUMENTS

JP 06-127951 5/1994

(Continued)

OTHER PUBLICATIONS

Yamazaki, Taku, Production of Porous Preform For Optical Fiber and Production Apparatus Therefor, Machine translation of JP 2001-019463, Jan. 23, 2001.*

(Continued)

*Primary Examiner*—Steven P. Griffin
*Assistant Examiner*—Queenie Dehghan
(74) *Attorney, Agent, or Firm*—Finnegan, Henderson, Farabow, Garrett & Dunner, L.L.P.

(57) ABSTRACT

A method and device for manufacturing a preform for optical fibres through chemical deposition on a substrate for deposition arranged vertically. A chemical deposition chamber includes at least one gripping member rotatably mounted about an axis Z-Z and adapted to hold at least one end of at least one elongated substrate for chemical deposition for the formation of a preform. The chamber includes at least one burner which is mobile along a direction Z substantially parallel to the axis Z-Z and adapted to deposit on the elongated substrate, a chemical substance for the formation of a preform and at least one suction element for collecting exhaust chemical substances. The suction element is arranged on the opposite side of the burner with respect to the axis Z-Z and is mobile along the direction Z and is positioned at a lower height than the burner.

2 Claims, 8 Drawing Sheets

FOREIGN PATENT DOCUMENTS

| | | | |
|---|---|---|---|
| JP | 06-211527 | | 8/1994 |
| JP | 07101745 | A * | 4/1995 |
| JP | 2001-019463 | | 1/2001 |
| JP | 2001019463 | A * | 1/2001 |
| JP | 2001-039730 | | 2/2001 |

OTHER PUBLICATIONS

Nozawa, Tetsuo, Glass Forming Method and Device Therefor, Machine translation of JP 07-101745, Apr. 18, 1995.*

Hitoshi, I., "Production of Porous Glass Preform and System Therefor", Patent Abstracts of Japan, JP. No. 03-054124, Mar. 8, 1991.

Takashi, K., "Method and Apparatus for Producing Preform for Optical Fiber", Patent Abstracts of Japan, JP. No. 07-330367, Dec. 19, 1995.

Hideo, H., "Production of Porous Glass Preform for Optical Fiber", Patent Abstracts of Japan, JP. No. 07-172859, Jul. 11, 1995.

Shigeru, E., "Production Device for Glass Preform", Patent Abstracts of Japan, JP. No. 09-002830, Jan. 7, 1997.

Yukio, K., "Synthesizing Method of Porous Preform for Optical Fiber and Device Therefor", Patent Abstracts of Japan, JP. No. 07-198966, Aug. 1, 1995.

Tamio, T., "Method and Apparatus for Manufacturing Preform for Optical Fiber", Patent Abstracts of Japan, JP. No. 58-208145, Dec. 3, 1983.

Hideo, H., "Apparatus for Producing Porous Glass Preform", Patent Abstracts of Japan, JP. No. 2000-313625, Nov. 14, 2000.

Hideo, H., "Producing of Optical Fiber Base Material", Patent Abstracts of Japan, JP. No. 11-001338, Jan. 6, 1999.

* cited by examiner

DEVICE AND METHOD FOR MANUFACTURING A PREFORM FOR OPTICAL FIBRES BY CHEMICAL VAPOUR DEPOSITION

CROSS REFERENCE TO RELATED APPLICATIONS

This application is a national phase application based on PCT/EP02/06778, filed Jun. 19, 2002, the content of which is incorporated herein by reference, and claims the priority of European Patent Application No. 01202444.4, filed Jun. 25, 2001 and claims the benefit of U.S. Provisional Application No. 60/303,410, filed Jul. 9, 2001.

BACKGROUND OF THE INVENTION

1. Field of the Invention

The present invention relates to a device for manufacturing a preform for optical fibres through chemical deposition on a substrate for deposition arranged vertically. More specifically, the invention relates to a device for manufacturing one or more preforms for optical fibres through a chemical deposition process on one or more substrates for deposition arranged vertically.

2. Description of the Related Art

As known, the methods for manufacturing optical fibre basically comprise a first process of manufacturing a preform from glass and a successive process of drawing the optical fibre from the preform.

The most common processes of manufacturing preforms comprise one or more chemical deposition steps, through one or more burners, of suitable chemical substances on a cylindrical support; the chemical deposition substances typically comprise silicon and germanium, which are deposited in the form of oxides ($SiO_2$ e $GeO_2$).

The processes of manufacturing preforms through chemical deposition known in the art comprise processes of the VAD (Vapor Axial Deposition) type and processes of the OVD (Outside Vapor Deposition) type.

Typically, in VAD type processes the cylindrical support is held in a vertical position by a gripping member which operates on an upper end of the cylindrical support; the cylindrical support is made to turn upon itself so as to expose its entire surface to one or more burners which are housed near to the lower end of the support and in such a position as to emit a flow of reactants along a direction which is inclined at a predetermined angle, typically lying between 30° and 50°, with respect to the longitudinal axis of the support. The support is then moved upwards so as to allow substantially axial growth of the preform.

In processes of the OVD type, on the other hand, the cylindrical support is held in a horizontal or vertical position by a pair of gripping members which operate on the opposite ends of the support; the support is made to turn upon itself so as to expose its entire surface to one or more burners mounted on a side of the support and in such a position as to emit the flow of reactants along a direction which is substantially perpendicular to the longitudinal axis of the support. The burner, in particular, is mounted on a support structure equipped with a motorised driving member which allows the repeated movement of the burner parallel to the cylindrical support, so as to allow a substantially radial growth of the preform along all the sections of the support.

A typical process of the OVD type comprises the following steps. In a first step a substantially cylindrical glass preform, called "core preform", is manufactured through deposition of the chemical substances on the cylindrical support: such a preform is named in such a way since it will create the core and a more internal portion of the optical fibre's cladding.

In a second step, the cylindrical support is taken out of the core preform, freeing up a central hole in the preform.

In a third step, the core preform undergoes a process of desiccation and compacting in a furnace, during which suitable gases (comprising, for example, $Cl_2$) are made to flow inside the central hole in order to eliminate the hydroxide ions (—OH) and the atoms of water present in the preform, thus obtaining a vitrified core preform which exhibits a central hole having a smaller diameter than that of the initial preform.

In a fourth step, after having created the vacuum inside the hole, the vitrified core preform is placed in a vertical furnace in which the melting of a lower end of the preform itself is carried out. Such a melting causes the walls of the hole to collapse due to the vacuum created inside of it; the glass material cools down to form an elongated cylindrical element of a predetermined diameter, which is pulled downwards by a suitable traction device. Such an elongated cylindrical element is then cooled down further and cut transversally at many equidistant points so as to form a plurality of elongated elements, also known as "core rods", typically having a length greater than 1 m and a diameter of between 10 and 20 mm.

In a fifth step, each core rod is used as a substrate for a further chemical deposition process (known as "overcladding") similar to that of the first step discussed earlier. In particular, on each core rod and through at least one burner, a plurality of chemical substances are deposited (amongst which, typically, there is silicon oxide) which will then constitute the outer portion of the optical fibre's cladding. At the end of the process a low-density final preform is obtained, from which the optical fibre will then be drawn. Before the drawing, the low-density final preform is desiccated and consolidated with the same procedures seen in the third step. In this way a vitrified final preform which is ready for the drawing process is obtained.

Various devices for manufacturing a glass (core or final) preform for optical fibres through processes of the OVD type are known. Such devices typically comprise a chemical deposition chamber inside which are housed the gripping members of the cylindrical support constituting the chemical deposition substrate for the formation of the preform, a burner which is mobile parallel to the longitudinal axis of the cylindrical support, and a suction hood positioned on the opposite side to the burner with respect to the cylindrical support and adapted to collect and remove the particulate and the exhaust chemical substances produced inside the chamber during the chemical deposition.

JP 11-1338 discloses a device for manufacturing a preform for optical fibres through an OVD process comprising a pair of burners which are mobile parallel to the longitudinal axis of a support for preform formation which rotates upon itself and a suction hood provided on the opposite side to the burners with respect to the cylindrical support and also mobile parallel to the longitudinal axis of the cylindrical support.

JP 2000-313625 discloses a device for manufacturing a preform for optical fibres, comprising a plurality of burners which are adjacent the one to the other and mobile parallel to the longitudinal axis of a support for preform formation, which support rotates upon itself. A suction hood is provided on the opposite side to said plurality of burners with respect to the cylindrical support; said hood also moves parallel to the longitudinal axis of the cylindrical support and in synchrony with said plurality of burners. In particular the hood and the plurality of burners are controlled by respective motors connected to a single motion control circuit.

U.S. Pat. No. 5,211,732 discloses a device for manufacturing a preform for optical fibres, wherein the gripping members hold the cylindrical support for preform formation in a vertical position and the chemical deposition takes place through a series of burners which substantially extends along the whole length of the cylindrical support and which is made to oscillate parallel to the longitudinal axis of the support in such a way that each burner only acts on a predetermined portion of support. The device, moreover, comprises an air circulation system comprising a honeycomb structure arranged upstream of the cylindrical supports and adapted to uniformly distribute, in the deposition area, the air which enters the chamber through a plurality of air suction members formed on the rear wall with respect to the burners, and a diffusor arranged downstream of the cylindrical supports and adapted to suck the air flows from inside the chamber. In particular, the honeycomb structure generates a plurality of air flows which are controlled so as to have substantially laminar flows distributed uniformly along the whole length of the cylindrical support and substantially perpendicular to the longitudinal axis of the support itself.

JP 2001-019463 relates to a technique for producing a porous preform for optical fibers, wherein glass particulates are blown from an oxygen-hydrogen flame burner to an horizontal axially rotating rod and are deposited thereon in a reaction vessel, and a moving stage mounted with the burner is moved back and forth between two turning points. An air exit having an exhaust hood is arranged on the side opposite to the oxygen-hydrogen burner with respect to the rod to discharge exhaust gases containing unreacted components, and the like, to the outside of the vessel. The air exit is moved in parallel to the burner via a moving stage, a guide, a motor, or the like, with a delay therefrom to efficiently introduce the exhaust gases from the burner into the exhaust hood.

SUMMARY OF THE INVENTION

The Applicant has found that, during the chemical deposition process, inside the chemical deposition chamber fluid dynamic phenomena occur such that the flow of reactants does not hit the cylindrical support at a right-angle to its longitudinal axis (ideal operating condition). The Applicant believes that, in a vertical deposition process, it is possible to restore such ideal operating condition by placing the hood at a different level with respect to the burner: indeed, in such a case a suction current is created which, as opposed to the aforementioned fluid dynamic phenomena, brings the flow of reactants at a right-angle to the longitudinal axis of the cylindrical support.

The present invention relates, therefore, in a first aspect thereof, to a device for manufacturing a preform for optical fibres through chemical deposition on a substrate for deposition arranged vertically, comprising a chemical deposition chamber including:

at least one gripping member rotatably mounted about a vertical axis Z-Z and adapted to hold at least one end of at least one elongated element constituting a substrate for chemical deposition for the formation of a preform for optical fibres;

at least one burner which is mobile along a direction Z substantially parallel to said axis Z-Z and adapted to deposit, on said at least one elongated element, a chemical substance for preform formation;

at least one suction element for collecting exhaust chemical substances, said at least one suction element being arranged on the opposite side to said at least one burner with respect to said axis Z-Z and being mobile along said direction Z;

characterised in that said at least one suction element is positioned at a different height with respect to said at least one burner.

Advantageously, such a device allows a chemical deposition process to be carried out wherein the flow of reactants always hits the cylindrical support at a right-angle to its longitudinal axis (ideal operating conditions); it is thus possible to obtain preforms with characteristics of high uniformity and compactness.

Preferably, said at least one suction element is positioned at a lower height with respect to that of said at least one burner. Since the flow of reactants emitted by the burner is hotter than the surrounding air it tends to deviate upwards moving away from the ideal operating condition wherein it hits the cylindrical support at a right-angle to its longitudinal axis. Advantageously, by positioning the suction element at a lower height with respect to the burner the ideal operating conditions are restored in that a downward suction current is created which tends to oppose the rising effect of the flow of reactants and which, therefore, redirects such a flow at a right-angle to the longitudinal axis of the cylindrical support.

Preferably, said at least one suction element is kept at a different height with respect to that of said at least one burner during the deposition of said chemical substances for preform formation on said at least one elongated element.

Preferably, the difference in height between suction element and burner is varied during the process of chemical deposition to account for the variations in the process conditions (in particular, the temperature) which occur inside the chemical deposition chamber.

Preferably, the device of the present invention comprises a first moving system adapted to control the displacement of said at least one burner in direction Z and a second moving system adapted to control the displacement of said at least one suction element in direction Z, wherein said first and second moving systems are kinetically independent. Advantageously, this makes it possible to separately and independently control the motion of the burner and the motion of the suction element along the direction Z, and thus to realise synchronous or asynchronous motions along such a direction according to the desired fluid dynamic conditions inside the deposition chamber: in particular, this makes it possible to vary the height difference between suction element and burner during the chemical deposition process for the reasons mentioned above of optimisation of the fluid dynamic phenomena and of control of the temperature inside the deposition chamber.

Preferably, said first and second moving systems are substantially equal.

Preferably, the device of the present invention comprises a third moving system adapted to control the displacement of said at least one burner along a direction X substantially perpendicular to said direction Z and a fourth moving system adapted to control the displacement of said at least one suction element along said direction X.

The movement of the suction element and of the burner along the direction X can also be used, advantageously, during maintenance operations to facilitate the access and mobility of the operators inside the chemical deposition chamber.

Preferably, said third and fourth moving systems are kinetically independent. Advantageously, this makes it possible to separately and independently control the motion of the burner and the motion of the suction element along the direction X, and thus to realise synchronous or asynchronous motions along such a direction according to the fluid dynamic conditions desired inside the chemical deposition chamber.

Preferably, said third and fourth moving systems are substantially equal.

In a second aspect thereof, the present invention relates to a method for manufacturing a preform for optical fibres, comprising the following steps:

supporting at least one substrate for chemical deposition in a vertical position along an axis Z-Z;

rotating said at least one substrate about said axis Z-Z;

directing onto said at least one substrate a flow of at least one chemical substance generated by the emission of reactant gases and of at least one combustible gas by at least one burner, said at least one chemical substance being suitable to be deposited around said at least one substrate for forming at least one preform;

sucking the non-deposited part of said at least one chemical substance through at least one suction element arranged on the opposite side to said at least one substrate with respect to said at least one burner;

moving said at least one burner and said at least one suction element parallel to said axis Z-Z;

characterised in that said step of moving said at least one burner and said at least one suction element comprises the step of keeping said at least one burner and said at least one suction element on two different levels.

Preferably, said step of moving said at least one burner and said at least one suction element comprises the step of varying the difference in level between said at least one burner and said at least one suction element.

BRIEF DESCRIPTION OF THE DRAWINGS

Further characteristics and advantages of the present invention will become clearer from the following detailed description of some preferred embodiments, made with reference to the attached drawings. In such drawings.

DETAILED DESCRIPTION OF THE INVENTION

In such figures, with numeral reference 1 is indicated a device for manufacturing one or, preferably more (for example, in the specific case described and illustrated here, four) preforms of glass material for optical fibres in accordance with the present invention. Such a device is suitable for carrying out a simultaneous chemical deposition, through a process of the OVD (Outside Vapor Deposition) type, on a predetermined number of cylindrical supports (for example, in the specific case described and illustrated here, four) each constituting a substrate for chemical deposition for the realisation of a respective preform.

The device 1 comprises an external unit 2, preferably with rectangular walls, inside of which is defined a chemical deposition chamber 3. The unit 2 is internally coated with sheets of fibreglass which guarantee excellent resistance to the acid attack (which occurs during chemical deposition) and to the temperature.

In chamber 3 three different sections are defined: a first side section 3a, a central section 3b and, on the opposite side to the first side section 3a with respect to the central section 3b, a second side section 3c.

Figure 4:
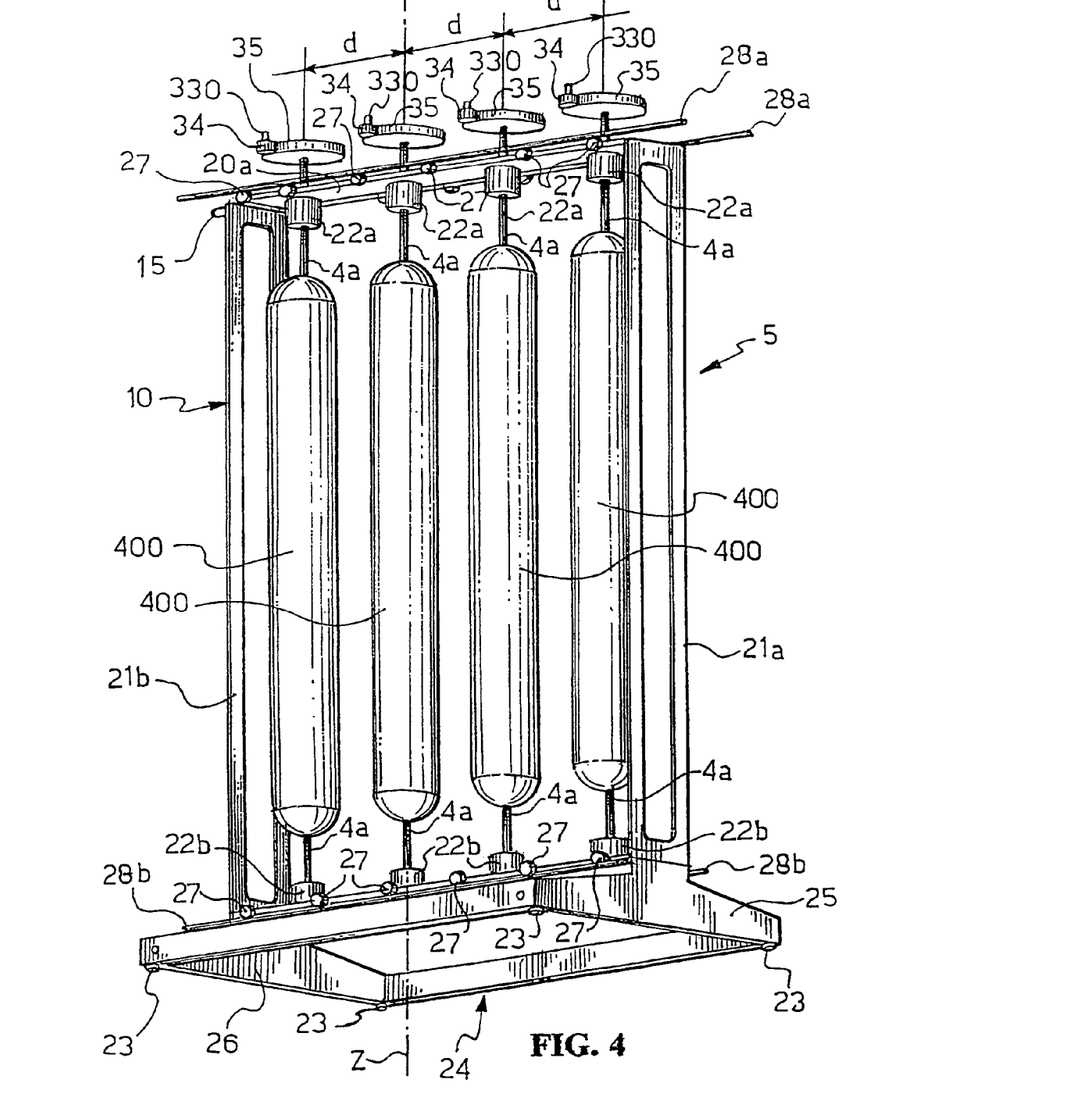
FIG. 4 is a schematic perspective view from below of a central portion of the inside of the device of FIG. 1 in the embodiment of FIG. 2 and from a point of view opposite to that of FIGS. 1 and 2.

The first side section 3a houses a plurality of burners 4 (for example, in the specific case described here, four, only one of which being illustrated) of the conventional type, each of which is adapted to blow a chemical substance for forming a preform, in particular a mixture of silicon and germanium in the form of oxides ($SiO_2$ and $GeO_2$), on a respective cylindrical support 4a (of which, as shown in FIG. 4, only the ends are visible), so as to manufacture, at the end of the process of chemical deposition, a preform 400.

Alternatively, for each cylindrical support 4a two or more burners, placed one above the other or one next to the other, can be provided.

The central section 3b houses the cylindrical supports 4a for preform formation. Such supports are arranged in suitable gripping members which can be provided directly inside the chamber (integrally connected with the unit 2) or, as in the preferred embodiment illustrated in the attached figures, on a carriage 5 (shown alone in FIG. 4) which can be removed from the unit 2 of the device 1; the carriage is structurally disconnected from the unit 2 and is intended to be associated co-operatively with it when fully inserted in the chamber 3.

The second side section 3c houses a plurality of suction elements 6 (for example, in the specific case described and illustrated here, four hoods), each of which being adapted to collect and discharge the exhaust chemical substances produced by the burners 4 from the chemical deposition chamber 3.

The sections 3a, 3b and 3c follow each other in the chemical deposition chamber 3 along a horizontal direction X; in the chamber 3 are then defined a horizontal direction Y, substantially perpendicular to the direction X, which constitutes the insertion/removal direction of the carriage 5 into/from the chamber 3, and a vertical direction Z, which constitutes the positioning direction of the cylindrical supports 4a in the chamber 3 during the chemical deposition process.

Figure 2:
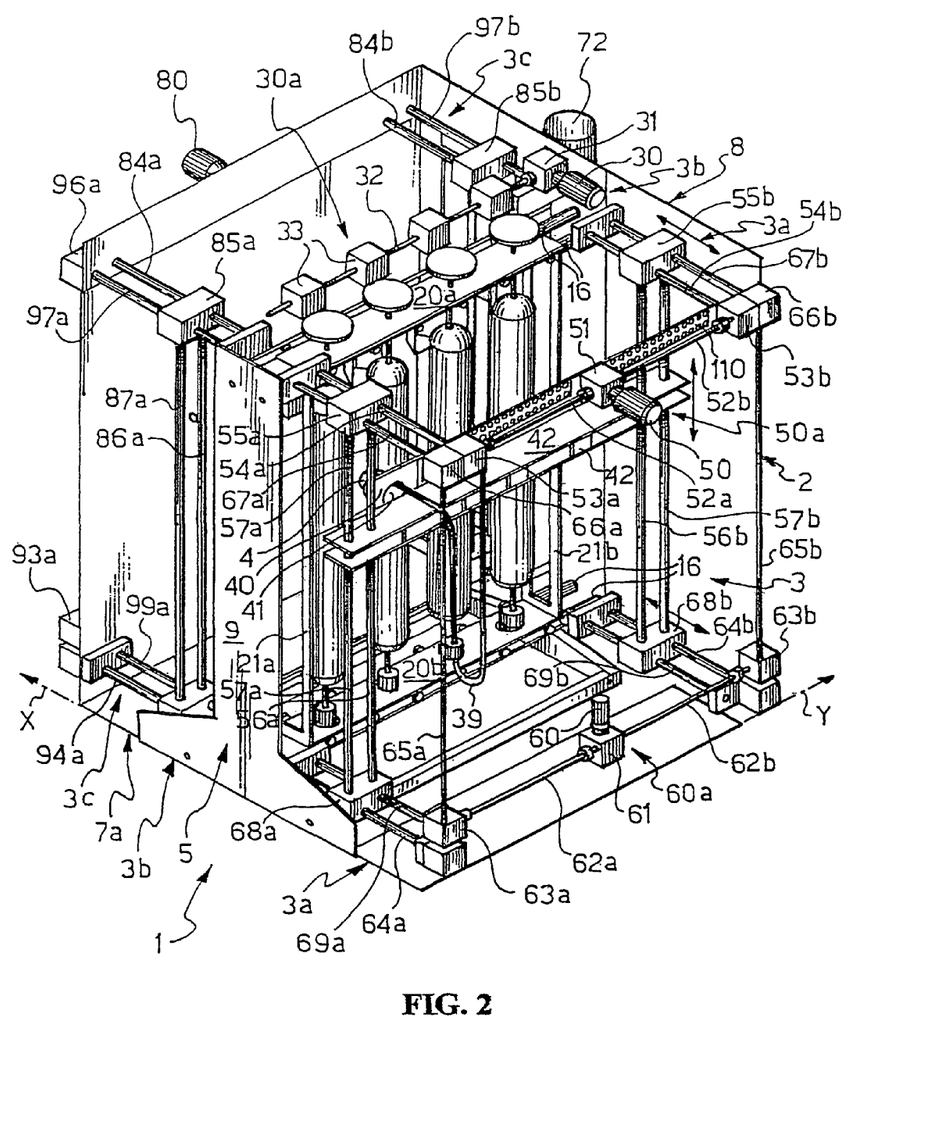
FIG. 2 is a schematic perspective view of the inside of the device of FIG. 1, in a first embodiment thereof.

In its working configuration, illustrated in FIG. 2, the device of the present invention exhibits the carriage 5, with the cylindrical supports 4a already loaded, fully inserted in the central section 3b of the chemical deposition chamber 3. In such a configuration, each of the cylindrical supports 4a is lined up along direction X and situated between a corresponding burner 4 and a corresponding suction hood 6.

The unit 2 of the device of the invention comprises a frontal side wall 7 (according to the point of view of FIG. 2) extended perpendicularly to the direction Y and centrally provided with an opening 7a to allow the insertion and removal, along the direction Y, of the carriage 5 in and from the central section 3b of the chemical deposition chamber 3. Moreover, the unit 2 comprises a rear side wall 8 (according to the point of view of FIG. 2) extended parallel to the wall 7.

The carriage 5 comprises a frontal side surface 9 (according to the point of view of FIG. 2) of a form which is conjugate to that of the opening 7a and adapted to close this opening when the carriage 5 is fully inserted in the chamber 3. The carriage 5, moreover, comprises a rear side surface 10 (according to the point of view of FIG. 2) parallel to surface 9 and equipped, above and below, with a pair of abutment elements 15 (visible in FIGS. 3 and 4) adapted to co-operate with respective abutment elements 16 provided on the rear wall 8 of the unit 2. Preferably, the abutment elements 15 are pins whereas the abutment elements 16 are cylindrical bushes adapted to house the aforementioned pins inside of them when the carriage 5 is fully inserted in chamber 3.

Figure 3:
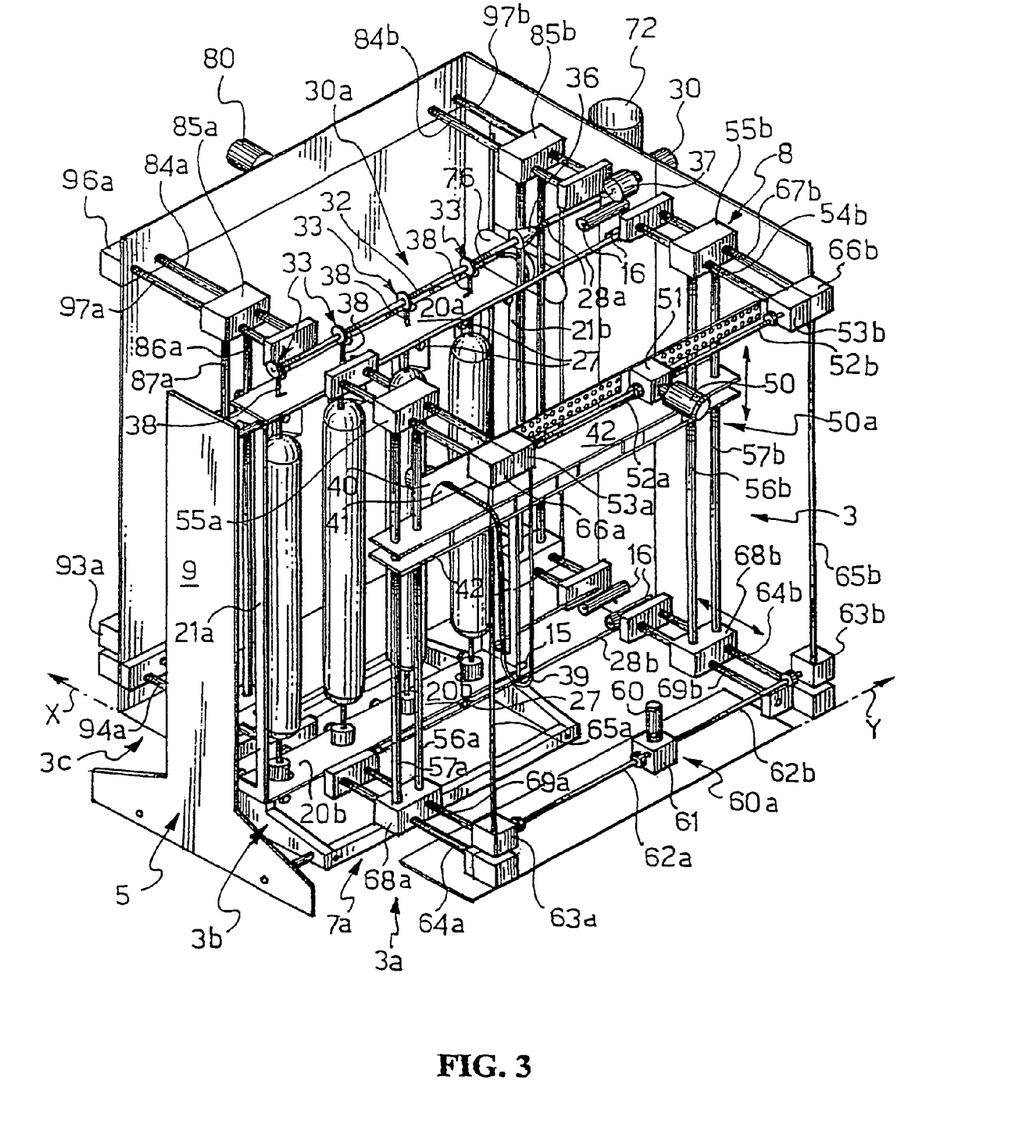
FIG. 3 is a schematic perspective view of the inside of the device of FIG. 1, in a second embodiment thereof.

As shown in FIGS. 2 to 4, the carriage 5 comprises, moreover, a pair of respective upper and lower ledgers 20a, 20b, and a pair of respective front and rear uprights 21a, 21b, (according to the point of view of FIG. 2). On the ledgers 20a, 20b a plurality of pairs of gripping members (in the specific example described and illustrated here, four pairs) are rotatably mounted. Each pair of gripping members comprises a pair of respective upper and lower chucks 22a, 22b, of the conventional type, realised, for example, in aluminium alloy (ergal); such chucks are adapted to hold opposing end portions of a respective cylindrical support 4a. The chucks 22a are rotatably mounted on the upper ledger 20a separated from each other by a predetermined distance d; in the same way, the chucks 22b are rotatably mounted on the lower ledger 20b separated from each other by the predetermined distance d; the chucks 22a and 22b of each pair of chucks are thus lined up along a respective vertical axis Z-Z: such an axis constitutes the rotational axis of the chucks 22a, 22b and coincides with the longitudinal axis of the cylindrical support 4a when it is positioned in the respective chucks 22a, 22b.

The carriage 5 comprises a plurality of elements for moving and supporting itself on the floor: such elements preferably comprise a plurality of spherical elements 23 of the conventional type; alternatively, the use of other elements of the conventional type, such as rollers, spinning wheels, etc., is provided.

The spherical elements 23 are preferably associated with a base frame 24 of the carriage 5; even more preferably, such spherical elements 23 are mounted at the free ends of respective front and rear arms 25 and 26, respectively (according to the point of view of FIG. 2), of the base frame 24. In an embodiment of the carriage 5 of the present invention which is not illustrated, the rear arm 26 comprises two opposing small arms hinged upon the base frame 24 through respective spring mechanisms which, in a rest state (carriage 5 fully removed from the chemical deposition chamber 3), force the small arms to open and which, when the carriage 5 is inserted in the chamber 3, are forced to close thus allowing the full insertion of the carriage itself in the chamber 3.

For the purpose of facilitating the insertion and removal of the carriage 5 in and from the chemical deposition chamber 3, the carriage 5 preferably comprises, moreover, a plurality of sliding rollers 27 associated with the upper and lower ledgers 20a, 20b and equipped with respective grooves adapted to engage with respective upper and lower sliding runners 28a, 28b, respectively, provided in the central section 3b of the chamber 3. In particular, the rollers 27 are lined up along the longitudinal edges of the ledgers 20a, 20b so as to have, on each ledger, two parallel lines of rollers. Correspondingly, in the central section 3b of the chamber 3 two pair of sliding runners are provided: a first pair 28a, on the upper surface of the chamber 3, adapted to co-operate with the rollers associated with the upper ledger 20a of the carriage 5, and a second pair 28b, on the lower surface of the chamber 3, adapted to co-operate with the runners associated with the lower ledger 20b of the carriage 5.

The position of the sliding rollers 27 and runners 28a, 28b can, however, be reversed, with the rollers 27 mounted on the upper and lower surfaces of the chamber 3 and the runners 28a, 28b provided on the carriage 5; alternatively, a mixed system of rollers and runners both on the carriage and in the chamber can be provided.

In a first alternative and not illustrated embodiment of the device of the present invention, the carriage 5 does not comprise the sliding rollers 27 and the chemical deposition chamber 3 does not comprise the sliding runners 28a, 28b; in such an embodiment the correct positioning of the carriage 5 in the chemical deposition chamber 3 depends exclusively upon the abutment elements 15 and 16 mentioned above.

In a second alternative and not illustrated embodiment of the device of the present invention, the sliding runners 28a, 28b are of the telescopic type and can be extracted from the chemical deposition chamber 3; in such an embodiment, the carriage 5 does not comprise the members for transportation on the floor (spherical elements 23): the removal and the insertion of the carriage 5 from and in the chemical deposition chamber 3 can indeed rely exclusively upon the sliding runners 28a, 28b and the rollers 27. The movement of the carriage 5 outside of the chemical deposition chamber can be achieved by providing, on the ceiling or the floor of the room which houses the device of the invention, a suitable system of rails or sliding runners for the rollers 27 of the carriage 5.

The structure of the carriage 5 (in particular the two ledgers 20a, 20b and the two uprights 21a, 21b) is preferably realised in anodised hard aluminium alloy (anticorodal), with an anodisation thickness preferably of about 30-80 μm, more preferably of about 60 μm. The use of an anodised aluminium alloy allows a good resistance to corrosion by acids, which could show up after chemical deposition, to be achieved together with lightness and low cost (with respect, for example, to stainless steel).

Preferably, a handle (not illustrated) is associated with the front surface 9 of the carriage 5 to facilitate the insertion/removal manoeuvres in/from the chamber 3 and its movements outside of the chamber. One or more inspection windows (not shown) are provided, for example, on the side surface 9 of the carriage 5 and/or on the wall 8 of the unit 2. A door of access to the chamber 3 can, moreover, be provided in the wall 8 of the unit 2, at the section 3a, 3b or 3c.

The rotation of the cylindrical supports 4a about the respective rotational axes Z-Z during the process of chemical deposition takes place by operating the rotation of at least one of the chucks 22a, 22b; in accordance with the embodiments illustrated in the attached figures, the upper chucks 22a are driven, while the lower chucks 22b are mounted idle on the lower ledger 20b of the carriage 5. For such a purpose, the device 1 of the invention comprises a motor 30 and a first kinematic chain 30a placed between the motor 30 and the chucks 22a, illustrated in detail in FIG. 2. Alternative embodiments of the device of the present invention can be provided wherein both the upper and lower chucks 22a, 22b or only the lower chucks 22b are controlled to rotate.

In a first embodiment of the device of the present invention, illustrated in FIGS. 2 and 4, the motor 30 is preferably housed in the upper part of the central portion 3b of the chamber 3. The kinematic chain 30a comprises an angular transmission member 31 kinetically associated with the motor 30 and with a horizontal countershaft 32 which extends along direction Y; such a countershaft 32 is kinetically associated with a plurality of 90° angular transmission members 33 (for example, in the specific case described and illustrated here, four transmission members). Each angular transmission member 33 is in turn kinetically associated with a vertical countershaft 330

(only partially visible in FIG. 4) upon which a toothed wheel 34 is force fitted. Each wheel 34 engages, when the carriage 5 is fully inserted in the chemical deposition chamber 3, with a corresponding toothed wheel 35 arranged on the upper surface of the upper ledger 20a of the carriage 5; this wheel is integrally connected and coaxial with the chuck 22a.

In an alternative embodiment of the device of the present invention, illustrated in FIG. 3, the horizontal countershaft 32 is integrally connected with the carriage 5 and comprises, on one of its free ends, a conical or alternatively toothed clutch 36, adapted to be kinetically associated, when the carriage is fully inserted in the chemical deposition chamber, with a corresponding sleeve 37 integrally connected with the motor 30. A plurality of 90° angular transmission members 33 (for example, in the specific case described and illustrated here, four transmission members) are kinetically associated to the shaft 32. Each angular transmission member 33 is in turn kinetically associated with a vertical countershaft 38 which is substantially coaxial to the rotational axis Z-Z of the cylindrical supports 4a.

In a further embodiment (not shown) of the device of the present invention, all the members for moving the preforms (motor 30 and kinematic chain 30a) are integrated in the carriage 5, which is arranged to allow an electrical connection for the power supply.

As already mentioned, the unit 2 houses, at section 3a of the chemical deposition chamber 3, four burners 4. Such burners are placed at the predetermined distance d from each other so that they are lined up along the direction X with the cylindrical supports 4a when the carriage 5 is fully inserted in the chamber 3.

During the process of chemical deposition, the burners 4 move together along the vertical direction Z (which is parallel to the longitudinal axes Z-Z of the cylindrical supports 4a), preferably with different speeds in the working stroke (which, preferably, is an upwards stroke) and the return stroke (downwards stroke). The direction of the working and return strokes can, however, be reversed.

The burners 4 are, moreover, preferably capable of moving towards/away from the supports 4a along the direction X. Such a motion allows the distance between the burners 4 and the side surfaces of the preforms 400 in formation to be controlled, so that, for example, during the chemical deposition, it always maintains a predetermined value, so as to control the temperature of the side surface of the preforms in formation (such a temperature would indeed tend to change due to the fact that, when the preform grows, the distance between the burners 4 and the side surface of the preform would tend to decrease).

The movement of the burners along the directions X and Z can also be used, advantageously, during the maintenance operations to facilitate the assembly and disassembly of the burners themselves and/or the entry (should the possible door of access be provided at the section 3a) and the mobility of the operators inside the chamber 3.

The burners 4 are positioned in such a way as to emit the flow of reactants along a direction substantially perpendicular to the axis Z-Z of the cylindrical supports 4a. The burners 4 are mounted on respective plates 40 equipped, at the centre, with a preferably circular hole 41 to allow the easy connection to the burner of the gas feeding tubes 39 coming from outside of the unit 2.

Figure 5:
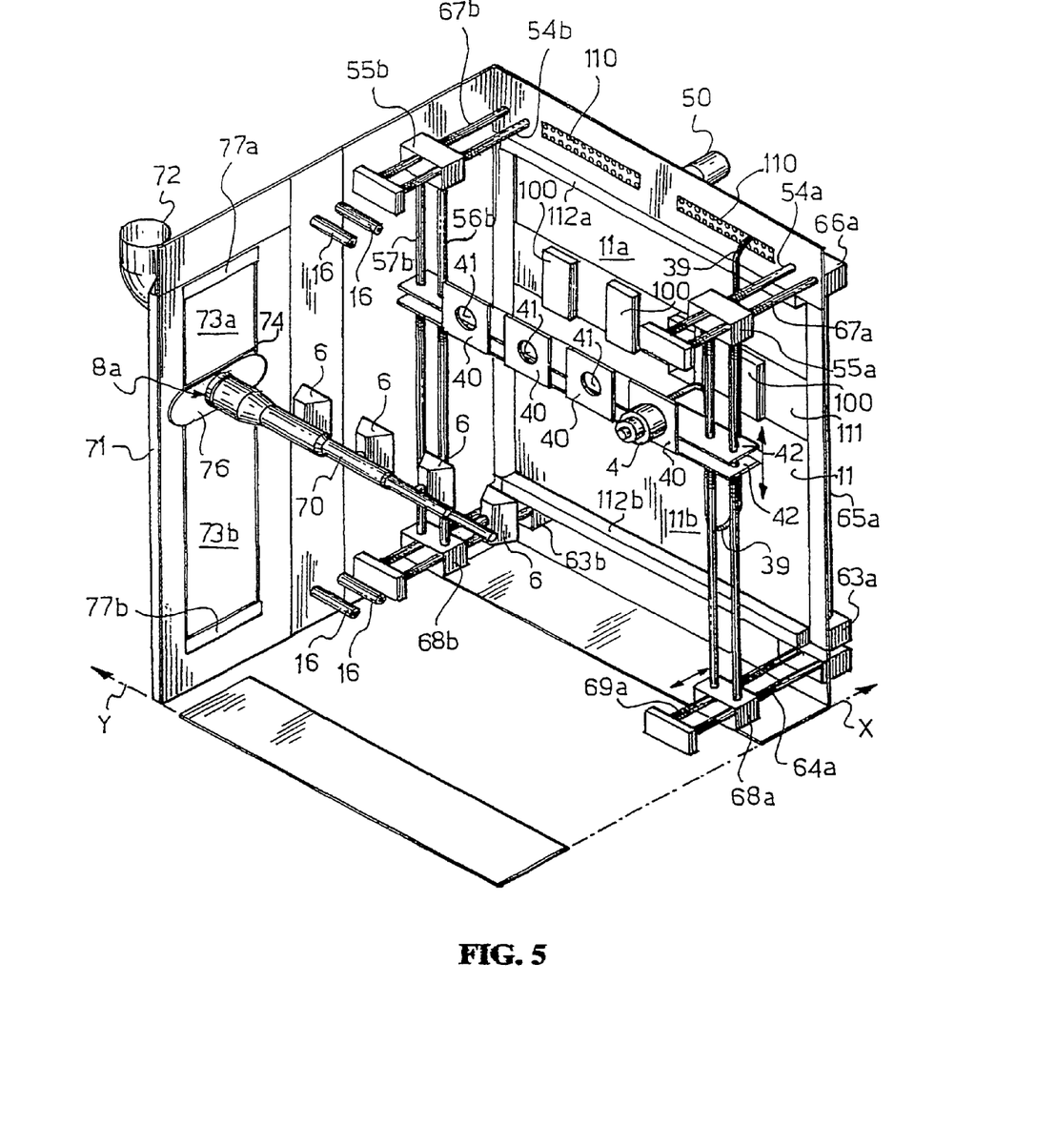
FIG. 5 is a schematic perspective view of the inside of the device of FIG. 1 with some of its constructive elements removed, from a point of view opposite to that of FIG. 1.
Figure 8:
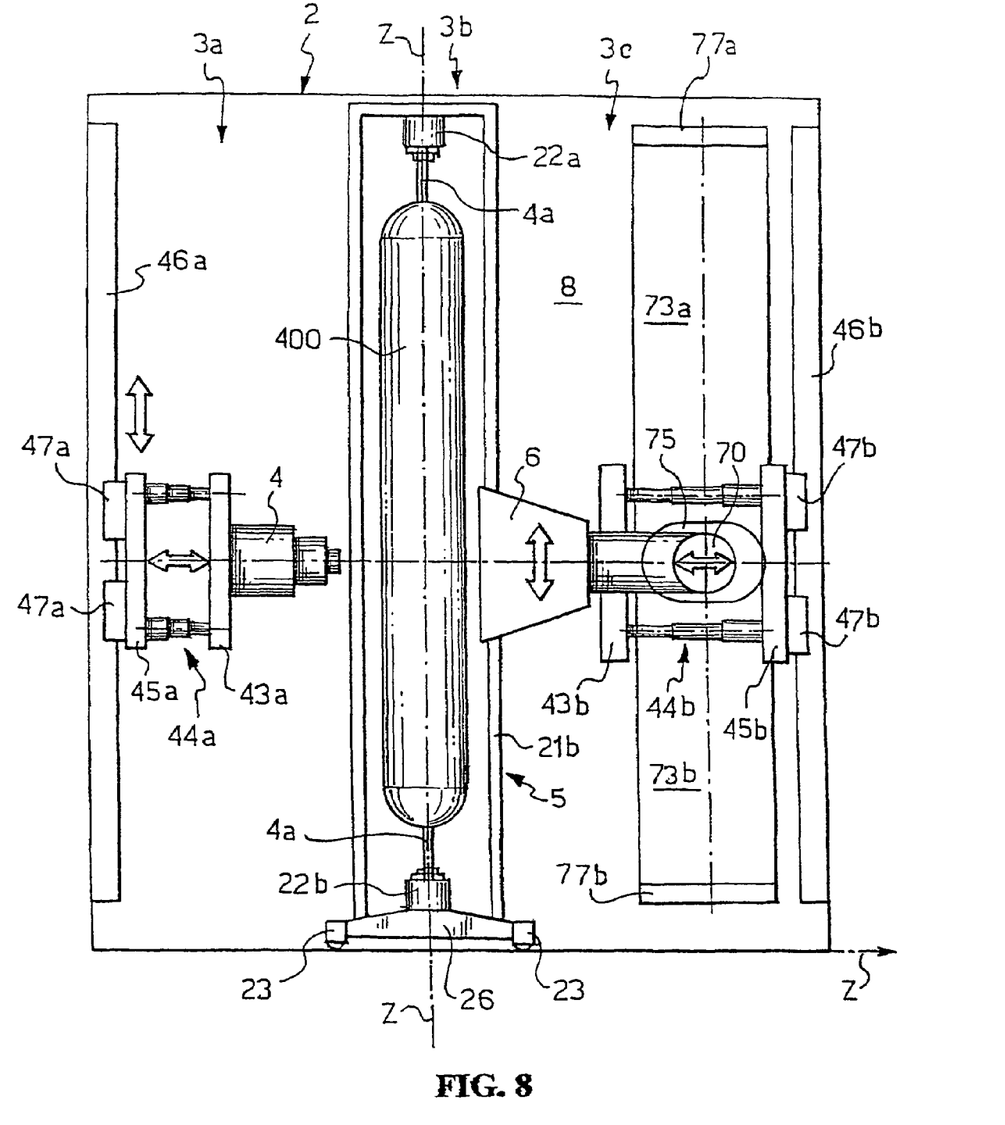
FIG. 8 is a schematic side view of the inside of the device of FIG. 1, in an alternative embodiment thereof.

The burners 4 are associated with a system suitable for allowing their movement, in the vertical direction Z and in the horizontal direction X, towards or away from the cylindrical supports 4a. The FIGS. 2, 3 and 5 illustrate a first embodiment of such a system for moving the burners along the directions X and Z; FIG. 8 illustrates a second embodiment of the aforementioned system for moving the burners.

In accordance with the embodiment illustrated in FIGS. 2, 3 and 5, the plates 40 are mounted on a pair of ledgers 42 which are substantially horizontal and integrally attached the one with the other.

Preferably, the construction material of the plates 40 and of the ledgers 42 is, as said with respect to the carriage 5, an anodised hard aluminium alloy (anticorodal); this allows to achieve the aforementioned advantages of resistance to corrosion by acids (which can show up after chemical deposition), of lightness and of low cost.

The system for moving the burners in the vertical direction Z comprises a motor 50 and a kinematic chain 50a placed between the motor 50 and the ledgers 42.

The motor 50 is preferably placed outside of the chamber 3, at the section 3a, in the upper part of a wall 11 of the unit 2 substantially perpendicular to the wall 7. The kinematic chain 50a comprises a double angular transmission member 51 kinetically associated with the motor 50 and, placed in a mirror-like arrangement on opposite sides with respect to the double angular transmission member 51, a pair of countershafts 52a, 52b extended horizontally along the direction Y. Each of the shafts 52a, 52b is in turn kinetically associated with a 90° angular transmission member 53a, 53b which transfers the motion to a corresponding grooved shaft 54a, 54b extended inside the chamber 3, along the direction X, in the upper part of the section 3a. Each grooved shaft 54a, 54b is kinetically associated (through a sliding sleeve which cannot be seen in the figures) with a 90° angular transmission member 55a, 55b which transfers the motion to a vertical ballscrew 56a, 56b; the pair of ledgers 42 for supporting the burners is then associated with each screw 56a, 56b through a nut screw (not illustrated). Through the aforementioned kinematic chain, the motion imparted by the motor 50 is transferred to the ballscrews 56a, 56b and is converted into the movement along the direction Z of the ledgers 42 and, therefore, of the burners associated with them. The translational motion is guided along the direction Z by a pair of vertical sliding runners 57a, 57b, associated with the ledgers 42 for supporting the burners and extended parallel and adjacent to the screws 56a, 56b.

In other words, the vertical ballscrews 56a, 56b are assigned the function of pushing the ledgers 42, while the vertical runners 57a, 57b are assigned the function of guiding such a movement. There are two screws 56a, 56b in order to balance out the thrust.

The movement of the burners in the horizontal direction X towards or away from the cylindrical supports 4a takes place by controlling the movement along such a direction of the ballscrews 56a, 56b and of the runners 57a, 57b (and, therefore, of the ledgers 42 for supporting the burners which are associated with them). For such a purpose, the device 1 of the invention comprises a motor 60 and a kinematic chain 60a placed between the motor and the ballscrews 56a, 56b.

The motor 60 is preferably placed outside of the chamber 3, at the section 3a, in the lower part of the wall 11. The kinematic chain 60a comprises a double angular transmission member 61 kinetically associated with the motor 60 and, positioned in a mirror-like arrangement on opposite sides with respect to the double angular transmission member 61, a pair of transmission countershafts 62a, 62b extended horizontally along the direction Y. Each of the shafts 62a, 62b is in turn kinetically associated with a 90° angular transmission member 63a, 63b which transfers the motion to a corresponding ballscrew 64a, 64b extended along the direction X in the lower part of the section 3a of the chamber 3. Each angular transmission member 63a, 63b transfers, moreover, the motion to a vertical shaft 65a, 65b which is kinetically associated with a 90° angular transmission member 66a, 66b positioned in the upper part of the wall 11. Such a transmission member transfers the motion to a ballscrew 67a, 67b which extends in the upper part of the inside of the chamber 3 along the direction X.

On each of the lower screws 64a, 64b a block is engaged (through a lead nut which cannot be seen in the figures) which moves in the direction X when the aforementioned screws turn. Each of the upper screws 67a, 67b is associated (through a nut screw which cannot be seen in the figures), to the angular transmission member 55a, 55b which moves in the direction X when the aforementioned screws turn. Moreover, the vertical screws 56a, 56b and the vertical runners 57a, 57b are associated with the blocks 68a, 68b. The translational motion is guided along the direction X by a pair of horizontal sliding runners 69a, 69b associated with the blocks 68a, 68b and extended parallel and adjacent to the screws 64a, 64b.

In other words, the lower and upper horizontal ballscrews 64a, 64b and 67a, 67b respectively are assigned the function of pushing the vertical ballscrews 56a, 56b and the runners 57a, 57b (and, thus, the ledgers 42 for supporting the burners which are associated to them), while the horizontal runners 69a, 69b are assigned the function of guiding such movement. There are four screws 64a, 64b and 67a, 67b, two above and two below, in order to balance out the thrust.

All the screws and the runners mentioned above are protected from the corrosive acidic substances, which generate during the chemical deposition, through bellows made of sewn and sealed Kevlar material.

Figure 6:
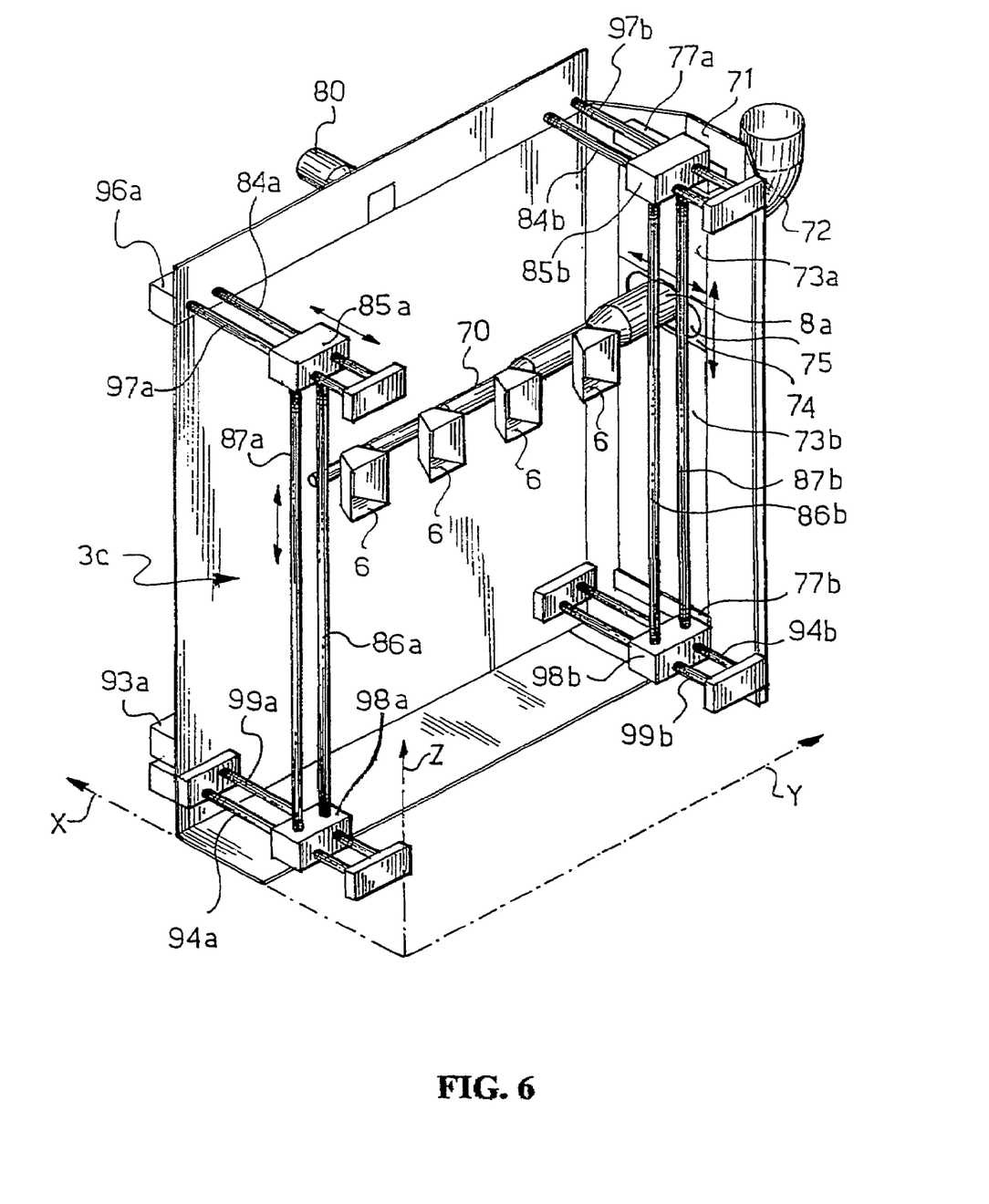
FIG. 6 is a schematic perspective view of a side portion of the device of FIG. 1, from a first point of view.

As already mentioned and as shown in FIGS. 5 and 6, the unit 2 houses, at the section 3c of the chemical deposition chamber 3, four suction hoods 6. The hoods are positioned at a predetermined distance d from each other so as to be arranged in front of the cylindrical supports 4 on the opposite side with respect to the burners when the carriage 5 is fully inserted in the chamber 3.

The suction hoods 6 move all together, during the process of chemical deposition, along the vertical direction Z (i.e. parallel to the longitudinal axis Z-Z of the cylindrical supports 4a).

The hoods 6, during their motion, are placed at a different level to that of the burners in order to optimise the fluid dynamic effects in the area surrounding each cylindrical support 4a and to facilitate the collection and discharge of exhaust gases. More preferably, the hoods 6 are placed at a lower level with respect to the burners and remain always at a lower level during the whole process of chemical deposition. By keeping the hoods 6 at a lower level with respect to the burners 4, the suction current generated by the hoods themselves tends to oppose the rising effect of the gases caused by the high temperatures, thus keeping the flow of such gases substantially horizontal in the interaction with the preform in formation.

Advantageously, the provision of a suction hood downstream from the preform along the fluid dynamic path of the gases and reactants and the positioning of the hood at a lower level with respect to that of the burner allows an impact direction of the gas flow on the preform which is substantially perpendicular to the axis of the preform to be maintained. In substance, such an arrangement allows the detachment of the laminar boundary layer (the meaning of which is known in thermal fluid dynamics) from the surface of the preform to be delayed: in such a way, advantageously, an increase in the yield of the process of chemical deposition and an improvement of the characteristics of compactness and uniformity of the preform is achieved.

The motion of the hoods 6 in the direction Z can be synchronised with the motion of the burners, or else, for particular reasons of fluid dynamic optimisation, it is possible to provide for a motion which is different (not synchronised) with respect to that of the burners, and, that is, to provide for a variation in the difference in level between the hoods and the burners; this is allowed by the fact that the systems for moving the hoods and the burners are independent, as described below. Such a variation in level can be required to compensate the variations in temperature which occur inside the chamber 3, or else to compensate the variation of one or more of the parameters of the deposition process. For example, if during the process the flow rate of the reactant gases needs to be increased, the difference in level between the hoods and the burners is increased to increase the sucking effect towards the bottom generated by the hoods, thus ensuring that the impact trajectory of the gas flow with the preform in formation is substantially perpendicular.

Figure 7:
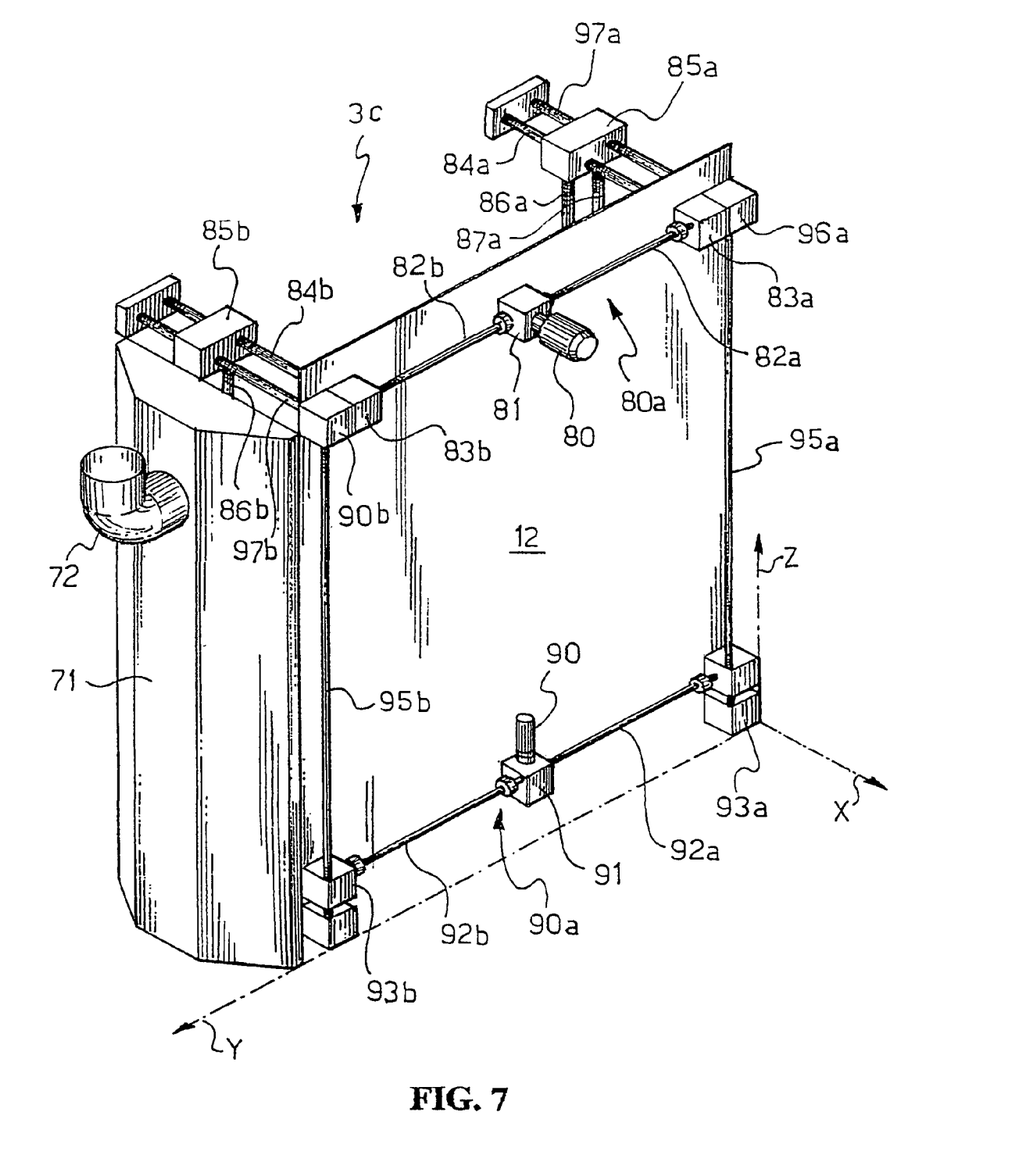
FIG. 7 is a schematic perspective view of the side portion of FIG. 6, from a second point of view opposite to that of FIG. 6.

The hoods 6 are preferably associated with a substantially horizontal supporting ledger (not illustrated) and can be oriented manually. Such a ledger, moreover, supports a substantially horizontal collector tube 70 for collecting and discharging chemical substances and the particulate generated in the chamber 3 during chemical deposition. The tube 70 is in turn in fluid communication with an exhaust chamber 71 (FIGS. 6 and 7) through an exhaust opening 8a formed on a side portion of the wall 8 of the unit 2; this chamber is adapted for taking the exhaust gases to a scrubber, through a heat-resistant tube 72.

The collector tube 70 exhibits a section which is variable and progressively growing as it approaches the exhaust opening 8a.

The ledger supporting the hoods 6 and the collector tube 70 is associated with a first system suitable for allowing the movement of the ledger itself (and thus of the hoods associated with it) in the vertical direction Z and with a second system suitable for allowing the movement of the ledger itself (and thus of the hoods associated with it) in the horizontal direction X towards/away from the cylindrical supports 4a. Such systems are substantially identical and specular to those described above which allow the movements along the direction X and Z of the burners; they are, moreover, kinetically independent from these other systems so as to be able to separately and independently control the motion of the burners and the motion of the hoods (such motions, as already stated, can be synchronised or, for reasons of fluid dynamic optimisation, non-synchronised).

The FIGS. 2, 3, 6 and 7 illustrate a first embodiment of the systems for moving the hoods 6 along the directions X and Z; FIG. 8 illustrates a second embodiment of the aforementioned systems for moving the hoods.

In accordance with the embodiment illustrated in FIGS. 2, 3, 6 and 7, the movement of the hoods 6 in the vertical direction Z takes place by controlling the movement of the ledger supporting the hoods and the collector tube. For such a purpose, the device 1 of the invention comprises a motor 80 and a kinematic chain 80a placed between the motor 80 and the ledger supporting the hoods and the collector tube (see in particular FIGS. 6 and 7).

The motor 80 is preferably placed outside of the chamber 3, at the section 3c, in the upper part of a wall 12 of the unit 2 substantially parallel with the wall 11. The kinematic chain 80a comprises a double angular transmission member 81 kinetically associated with the motor 80 and, placed in a mirror-like arrangement on opposite sides with respect to the double angular transmission member 81, a pair of transmission countershafts 82a, 82b extended horizontally along the direction Y. Each of the shafts 82a, 82b is in turn kinetically associated with a 90° angular transmission member 83a, 83b which transfers the motion to a corresponding grooved shaft 84a, 84b extended along the direction X in the upper part of the section 3c, inside the chamber 3. Each grooved shaft 84a, 84b is kinetically associated (through a sliding sleeve which cannot be seen in the figures) with a 90° angular transmission member 85a, 85b which transfers the motion to a vertical ballscrew 86a, 86b; the ledger for supporting the hoods and the collector tube is then associated with each screw 86a, 86b through a nut screw (not shown). Through the aforementioned kinematic chain, the motion imparted by the motor 80 is transferred to the ballscrews 86a, 86b and converted into movement along the direction Z of the ledgers for supporting the hoods and the collector tube. The translational movement is guided along the direction Z by a pair of vertical sliding runners 87a, 87b, extended parallel and adjacent to the screws 86a, 86b.

In other words, the vertical ballscrews 86a, 86b are assigned the function of pushing the ledger supporting the hoods 6 and the collector tube 70, while the vertical runners 87a, 87b are assigned the function of guiding such movement. There are two screws 86a, 86b in order to balance out the thrust.

The movement of the hoods 6 in the horizontal direction X towards or away from the cylindrical supports 4a occurs by controlling the movement along such a direction of the ballscrews 86a, 86b and of the runners 87a, 87b (and, therefore, of the ledger supporting the hoods and the collector tube which is connected to them). For such a purpose, the device 1 of the invention comprises a motor 90 and a kinematic chain 90a placed between the motor 90 and the assembly of the ballscrews 86a, 86b and the guides 87a, 87b.

The motor 90 is preferably placed outside of the chamber 3, at the section 3c, in the lower part of the wall 12. The kinematic chain 90a comprises a double angular transmission member 91 kinetically associated with the motor 90 and, arranged in a mirror-like arrangement on opposite sides with respect to the double angular transmission member 91, a pair of countershafts 92a, 92b extended horizontally along the direction Y. Each of the shafts 92a, 92b is in turn kinetically associated with a 90° angular transmission member 93a, 93b which transfers the motion to a corresponding ballscrew 94a, 94b extended along the direction X and placed in the lower part of the section 3a, inside the chamber 3 (FIG. 6). Each angular transmission member 93a, 93b transfers, moreover, the motion to a vertical shaft 95a, 95b which is kinetically associated with a 90° angular transmission member 96a, 96b positioned in the upper part of the wall 12. Such a transmission member transfers the motion to a ballscrew 97a, 97b which extends in the upper part of the inside of the chamber 3 along the direction X.

A block 98a is engaged on each of the lower screws 94a, 94b (through a lead nut which cannot be seen in the figures). Such block moves in the direction X when the aforementioned screws turn. Each of the upper screws 97a, 97b is associated (through a nut screw which cannot be seen in the figures), with the angular transmission member 85a, 85b which moves in direction X when the aforementioned screws turn. Moreover, the vertical screws 86a, 86b and the vertical runners 87a, 87b are associated with the blocks 98a, 98b. The translational motion is guided along the direction X by a pair of horizontal sliding runners 99a, 99b associated with the blocks 98a, 98b and extended parallel and adjacent to the screws 94a, 94b.

In other words, the lower and upper horizontal ballscrews 94a, 94b and 97a, 97b respectively are assigned the function of pushing the vertical ballscrews 86a, 86b and the runners 87a, 87b (and, therefore, the ledger for supporting the hoods 6 and the collector tube 70 associated with them), while the horizontal runners 99a, 99b are assigned the function of guiding such movement. There are four screws 94a, 94b and 97a, 97b, two above and two below, in order to balance out the thrust.

All of the screws and runners mentioned above are protected, from the corrosive acidic substances which generate during chemical deposition, through bellows (not illustrated) in sewn and sealed Kevlar fabric.

As already stated, FIG. 8 illustrates an alternative embodiment of the systems for moving the burners 4 and hoods 6 along the directions X and Z. In accordance with such an embodiment, the movement of the burners along the horizontal direction X is realised by associating the burners 4 with a first vertical plate 43a which is mobile, for example through telescopic runners 44a, with respect to a second vertical plate 45a. The movement of the burners along the vertical direction Z is realised by associating the second vertical plate 45a with a pair of vertical runners 46a through sliding blocks 47a. In the same way, the movement of the hoods 6 along the horizontal direction X is realised by associating the hoods 6 with a first vertical plate 43b which is mobile, for example through telescopic runners 44b, with respect to a second vertical plate 45b. The movement of the hoods 6 along the vertical direction Z is realised by associating the second vertical plate 45b with a pair of vertical runners 46b through sliding blocks 47b.

Alternatively, instead of a single plate 43a and a single plate 45a which support all of the burners 4, a plurality of plates 43a and a plurality of plates 45a, each associated with a respective burner can be provided. This allows independence of movement for individual burners. The same can be realised for the plates 43b and 45b.

As already stated, the collector tube 70 is associated with the wall 8 of the unit 2, where it inserts into the exhaust chamber 71 at the exhaust opening 8a (FIGS. 5 and 6). In order to allow the movement in the direction X and Z of the collector tube in section 3c of the chamber 3 with respect to the wall 8, the device 1 of the invention preferably comprises a sliding coupling between the collector tube 70 and the wall 8.

In accordance with a first embodiment (illustrated in the attached figures) of the device of the present invention, such a coupling takes place, preferably, according to the following conditions: the portion of wall 8 in proximity of the collector tube 70 is defined by a pair of respective upper and lower, with respect to the collector tube 70, vertical tapes 73a, 73b which can slide in the direction Z. The tapes 73a, 73b are preferably made from stainless steel and are integrally associated, at the respective free ends, with an intermediate plate 74 which exhibits a central slot 75 (seen in FIG. 6) extended along the direction X for a length equal to or greater than the stroke of the collector tube 70 towards/away from the cylindrical supports 4a. A further plate defining a flange 76 (shown in FIG. 5 but not in FIG. 6 to allow the plate 74 to be seen) is integrally associated with the tube 70. The flange 76 is preferably realised in teflon.

The flange 76 faces the plate 74 towards the inside of the chamber and is larger than the slot 75 in order to close such a slot even when the collector tube 70 is at its end (base stroke position along the direction X); in this way the chemical deposition chamber 3 is fluid dynamically connected to the exhaust chamber 71 just through the collector tube 70 which inserts into the chamber 71 at the opening 8a formed in the flange 76. The plate 74 preferably exhibits runners for the horizontal movement of the flange 76. The flange 76 can alternatively face the plate 74 towards the outside of the chamber, or else the plate 74 can exhibit a seat inside of which the flange 76 is free to slide.

The tapes 73a, 73b are associated with respective winding/unwinding rollers (not shown); such rollers are positioned inside suitable boxes 77a, 77b mounted on the wall 8 of the unit 2, above and below, respectively, the rollers themselves. When the collector tube 70 rises, the upper tape 73a winds up on the roller positioned in the upper box 77a, while the lower tape 73b unwinds from the roller positioned in the lower box 77b, and vice versa. The winding of the tapes on the rollers is made easier by the presence of a winding spring in each of the two boxes 77a, 77b.

The movement in direction Z of the collector tube 70 is, therefore, allowed by the sliding in direction Z of the tapes 73a, 73b; the movement in direction X, on the other hand, is allowed by the sliding in direction X of the flange 76 with respect to the two tapes 73a, 73b.

Preferably, the construction material of the hoods 6, of the collector tube 70 and of the ledger supporting the hoods and tube is an anodised hard aluminium alloy (anticorodal); this allows the advantages of resistance to acid corrosion (which can show up after chemical deposition) and of lightness and low cost mentioned above to be achieved.

To move the plate 74, and thus the collector tube 70, in direction Z, instead of the tape system, a system using "bellows" elements (not shown) can be used. In practice, the tapes 73a and 73b can be replaced with a first and a second "bellows" element which support the plate 74 from above and below and define respective lower and upper portions (of variable extension) of the wall 8.

As a further possible alternative, instead of a system of tapes or using bellows elements, a non-sealed system can be used, such as a system comprising two series of opposing horizontal bristles extending from the opposite sides to the space defining the aforementioned side portion of the wall 8 defined in proximity of the collector tube 70. In this way, the bristles slightly overlap at the centre-line of the space. The flexibility of the bristles allow them to open and close as the collector tube passes through thus allowing the movement of the tube in direction Z and X. Although such a system does not guarantee a sealing of the inside of the chemical deposition chamber, it is advantageous simply from the constructive and economic point of view: moreover, the lack of a seal is not critical in that most of the exhaust gases are sucked in and discharged through the collector tube 70.

Figure 1:
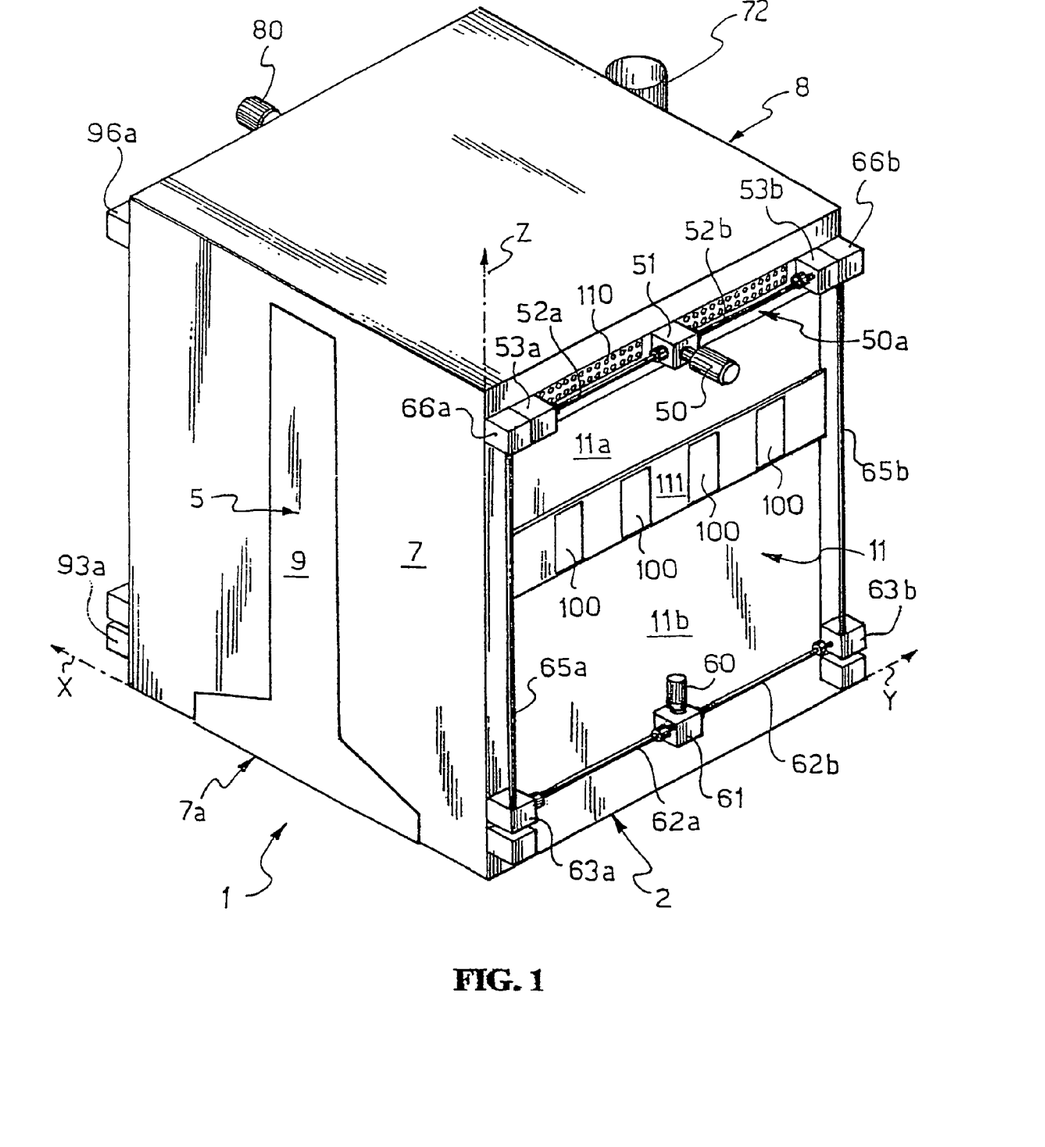
FIG. 1 is a schematic perspective view of a device according to the present invention.

With reference to FIGS. 1 and 5, the wall 11 of the unit 2, i.e. the wall situated behind the burners, exhibits, in its upper part, suitable openings 110 where respective pipe fittings (bulk-heads) are positioned, such pipe fittings being suitable for connecting rigid external tubes (not illustrated) for feeding gas to the chamber to flexible internal tubes (only one of which is represented, indicated with 39) for transferring gas to the burners. In practice, a flexible tube 39 is connected to each burner for each combustion gas and for each reactant gas.

The wall 11 exhibits, moreover, a plurality of air suction members 100 (preferably a number equal to the number of burners) to provide into the chamber 3 an air flow adapted to replace the air discharged by the suction hoods 6.

The air suction members 100 extends along a portion of the wall 11, in proximity of the single burners, and are mobile in direction Z with a motion which is synchronised with respect to that of the burners, so as to be substantially at the same level as the burners during the whole deposition process.

Preferably, the wall 11 comprises a system of sliding tapes similar to those described with reference to the sliding coupling between the collector tube 70 and the wall 8, to allow the motion along the direction Z of the air suction members 100. In particular, the wall 11 comprises a wide central portion which consists of a pair of respective upper and lower vertical tapes 11a, 11b with respect to the air suction members 100. Such tapes can be made from rubberised fabric, teflon, metal (preferably steel) and are integrally associated, at the respective free ends, with an intermediate plate 111. Such a plate exhibits, in proximity of the burners, a plurality of openings defining the aforementioned air suction members 100. Preferably, the plate 111 is integrally connected with the ledgers 42 for supporting the burners, so that the air suction members 100 are kinetically associated with the burners 4. The air suction members 100 can be, for example, rectangular, and can have a height of around 35-40 cm.

The tapes 11a, 11b are associated with respective winding/unwinding rollers (not shown) housed inside suitable boxes 112a, 112b (FIG. 5) mounted on the upper and lower part of the wall 11, respectively. When the ledgers 42 rise, the upper tape 11a winds up on the roller positioned in the upper box 112a while the lower tape 11b unwinds from the roller positioned in the lower box 112b and vice versa. The winding of the tapes on the rollers is made easier by the presence of respective winding springs.

To move the plate 111, instead of a tape system, a system of "bellows" elements (not shown) can be used. In practice, the tapes 11a and 11b can be replaced by a first and a second "bellows" element, which support the plate 111 from above and below and define the respective lower and upper portions (of variable extension) of the wall 11.

More generally, the air suction members 100 can be formed in any element which can be controllably moved in direction Z along the wall 11, for example through a runner-slide moving system. Such a moving system can be associated with the system for moving the ledgers 42, or can be independent.

As a further possible alternative, instead of a plurality of air suction members, there can be a single air suction member, having a horizontal extension substantially equal to that of the row of burners 4. In the same way as the case of a plurality of air suction members, the single air suction members can be formed in a plate associated with a pair of tapes which slide in the direction Z. Alternatively, the air suction members can be formed in any other element which is capable of moving vertically along the direction Z.

The device 1 comprises, moreover, a unit for feeding gas and reactants (not illustrated) positioned outside of the chemical deposition chamber 3 and an electric control board (not shown) for controlling the rotation of the preform and the movement of the burners 4 and the hoods 6 along the directions X and Z. Preferably, the unit for feeding gas and reactants and the electric control board are controlled by a centralised control unit (not illustrated).

In operation, with reference to the embodiment of the device of the invention illustrated in the attached figures, the cylindrical supports 4a are loaded onto the carriage 5 outside of the chemical deposition chamber 3 and, possibly, in a position away from it. The carriage 5 with the supports loaded is then inserted in the chamber 3; such an insertion is made easier by the presence of the sliding rollers 27 which engage with the sliding runners 28a, 28b. When the carriage is fully inserted in the chamber 3, the toothed wheels 34, kinetically associated with the motor 30 through the kinematic chain 30a, engage with the toothed wheels 35 placed on the upper ledger 20a of the carriage 5; the actuation of the motor 30 then operates the rotation of the cylindrical supports 4a and the process of chemical deposition can thus begin. During such a process the burners 4 and the hoods 6 move along the vertical direction Z and the horizontal direction X through the motion transmission members 50a, 60a, 80a, 90a described above, with the hoods 6 which always remain at a different height with respect to that of the burners 4 so as to optimise the fluid dynamic conditions inside the chamber. At the end of the deposition process the carriage 5 with the preforms 400 is removed from the chamber 3 of the unit 2 and is moved away from the unit 2, to be able to proceed to the operations of removal of the preforms, which will undergo the successive desiccation and consolidation steps.

What is claimed is:

1. A method for manufacturing a preform for optical fibres, comprising the following steps:
   (a) supporting at least one substrate for chemical deposition in a vertical position along an axis Z-Z;
   (b) rotating said at least one substrate about said axis Z-Z;
   (c) directing onto said at least one substrate a flow of at least one chemical substance generated by the emission of reactant gases and of at least one combustible gas by at least one burner, said at least one chemical substance being suitable to be deposited around said at least one substrate for forming at least one preform;
   (d) sucking the non-deposited part of said at least one chemical substance through at least one suction element arranged on the opposite side to said at least one substrate with respect to said at least one burner; and
   (e) moving said at least one burner and said at least one suction element parallel to said axis Z-Z;
   wherein the step of moving said at least one burner and said at least one suction element further comprises the step of keeping said at least one suction element always at a lower height with respect to that of said at least one burner.

2. The method according to claim 1, wherein said step of moving said at least one burner and said at least one suction element further comprises the step of varying the difference in level between said at least one burner and said at least one suction element.

* * * * *